Aug. 22, 1939.                K. KOHL                2,170,028
TRANSMITTING AND RECEIVING DEVICE FOR ULTRA-SHORT WAVES
Filed March 4, 1935
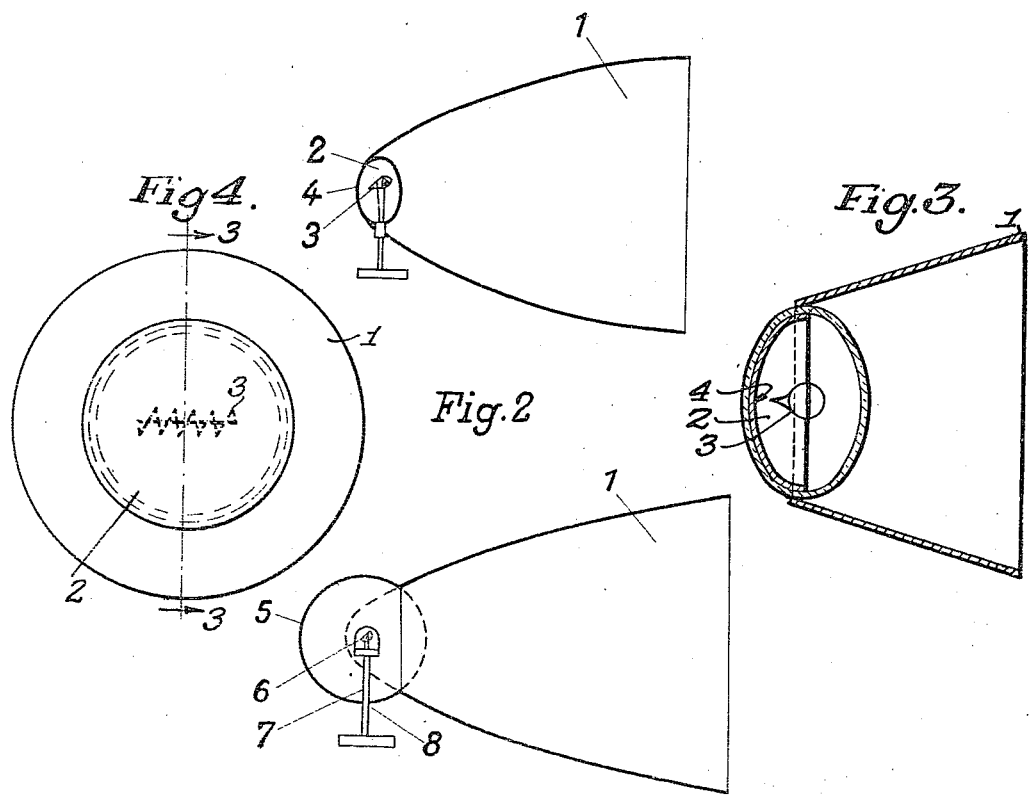
Inventor:
K. Kohl
By Glascock Downing & Seebold
Attys.

Patented Aug. 22, 1939

2,170,028

UNITED STATES PATENT OFFICE 2,170,028

TRANSMITTING AND RECEIVING DEVICE FOR ULTRA-SHORT WAVES

Karl Kohl, Berlin, Germany, assignor to Naamlooze Venootschap Machinerieen-en Apparaten Fabrieken "Meaf", Utrecht, Netherlands Application March 4, 1935, Serial No. 9,298 In Germany March 9, 1934

4 Claims. (Cl. 250—11)

This invention relates to a device for transmitting and receiving ultra-short waves.

It is known to employ parabolic, hyperbolic or spherical mirrors for the directional transmission and reception of electric ultra-short waves. To obtain a ray as little divergent as possible and to take up as much energy as possible at the receiver it has been proposed to render the diameter of the mirror large as compared with the wavelength employed, the focal length chosen being either equal to λ/4 or much larger than the wavelength.

By comparative measurements and a corresponding transformation of the mirrors it can be shown, however, that an excellent directional effect and concentration of the ultra-short waves will take place even if the focal length of the mirrors, according to the invention, is made small relative to the wavelength, and particularly small relative to λ/4. As heretofore, it is of course advantageous to render the aperture of the mirrors larger than the wavelength and the mirrors themselves as long as possible. In this form, the mirrors are comparable to the speaking tubes or receiving funnels of acoustic transmitters and receivers. In a mirror fully constructed as suggested above, in which the transmitter or receiver is arranged at a distance from the apex of the mirror that is small relative to the wavelength, the waves reflected from the apex of the mirror would, however, meet the emitter in improper phase and thus cause a diminution of the received or transmitted energy.

To avoid undesirable radiation at the transmitter at the open end of the tubular mirror and, at the receiver, an undesirable increase in damping the radiation of the aerial or of the oscillatory circuit, the end of the mirror is covered by a spherical, parabolic or hyperbolic metal cap. This arrangement provides also more space for the accommodation of the transmitter or receiver.

According to a further embodiment of the invention, this metal cap can be produced by imparting to the glass bulb of the vacuum vessel containing the oscillatory or aerial circuit a spherically, parabolically or hyperbolically curved form and providing the inside or outside thereof partly with a metal reflection. To attain a reflection in proper phase from the metal cap to the aerial circuit, the distance from the latter and the metal cap is then chosen to be equal to an odd multiple of λ/4 or λ/2, according to whether an open or closed oscillatory circuit is employed. The joint between the metal cap and the tubular mirror is preferably made quite small. Either a metallic contact is made in case of external reflection or, with internal reflection, a short-circuit condenser is produced for the ultra-short waves by the overlapping of the cap and reflector tube.

Another special modification provides a spherical, parabolic or hyperbolic metal cap metallically connected with the tubular mirror and having the aerial circuit in the focus thereof, the wiring being preferably insulated and effected through an opening in the cap. The radius of this spherical metal cap or the focal lengths of the parabolic or hyperbolic caps are, as in the first embodiment, preferably chosen to be equal to an odd multiple of λ/4 or an integral multiple of λ/2, according to whether an open or closed aerial circuit is employed.

The foci of the tubular mirror and of the cap coincide therefore, and the oscillatory and aerial circuit can then be conveniently adjusted in this focus.

By way of example, the invention is diagrammatically illustrated in the accompanying drawing, in which Figure 1 shows a parabolic mirror, the focal length of which is smaller than the wavelength; Fig. 2, a tubular mirror, the focal length of which is small relative to the wavelength; Fig. 3 shows a cross section of a reflector with a magnetic oscillator at the focal point thereof; and Fig. 4 shows a side view of the reflector of Fig. 3.

Referring to the drawing, and first to Fig. 1, the strongly curved portion of the mirror is removed, and at this point a tube 2 is disposed which contains a closed oscillatory circuit 3. The spherically or parabolically curved wall 4 of the tube 2 is metallized and replaces the cut-off cap of the tubular mirror 1. The distance from the oscillatory circuit and the metallized glass wall is small compared with the wavelength employed. The construction may serve as transmitter as well as receiver.

In the construction shown in Fig. 2 the tubular mirror 1, the focal length of which is small compared with the wavelength used, possesses at the point of greatest curvature a spherical hood 5 whose center coincides with the focus of the parabolic mirror.

The closed oscillatory circuit 6 at the apex of the mirror can be displaced for accurate adjustment near this common focus, preferably in three dimensions. The radius of the spherical hood 5 is chosen so as to be equal to an integral multiple of the wavelength. The leads 7 for the oscillatory circuit are passed through an opening 8 of the hood 5. The parts cut out of the spherical hood 5 and the parabolic mirror are indicated by broken lines.

In Figures 3 and 4, a reflector is shown in which the oscillator is enclosed within a tube, and the cap member is composed of a mirrored surface formed inside of the tube. The edges of the tubular mirror 1 and the cap member overlap, and are separated by the wall of the tube to form between the tubular mirror and cap a short circuit condenser. This capacitative connection provides a seal against the loss of high frequency energy from the oscillator. In addition, this connection eliminates the necessity for a structural joint between the tube and the cap member, and the attendant risk of cracking the tube by heat developed in soldering.

With the arrangement of the emitter according to the invention the processes of radiation take place chiefly in the space directed from the emitter or receiver towards the opening of the mirror. If tubes are used, in which the emitter consists of a closed structure, it is therefore advantageous to arrange the tube so that the closing member points in the direction of the mirror opening. In this case, the rays of a transmitter tube will pass from the closing member directly to the front into the reflector space and will be held together by the walls of the mirror. If the construction is used for receiving, the collection and concentration of the radiation will be particularly favorable with respect to the closing member. The same applies correspondingly to tubes with open transmitting structures, in which case the dipole will be arranged in the focus and the other parts of the generator or receiver on the side that is not facing the mirror opening.

I claim:

1. An arrangement for communicating with ultra-short waves comprising a reflector composed of a tubular mirror having a focal point and a cap member of different curvature than said mirror forming the apex of said reflector and also having a focal point, said cap being electrically connected to the tubular mirror to form a radiation tight reflector, the foci of said mirror and cap being substantially coincident, an ultra-short wave radiator positioned substantially coincident with said focal points, and the focal length of said tubular mirror being substantially smaller than, and the focal length of said cap member being at least equal to, one-fourth the wave length emitted by said radiator.

2. An arrangement for communicating with ultra-short waves comprising a reflector composed of a tubular mirror having a focal point and a cap member of different curvature than said mirror forming the apex of said reflector and also having a focal point, the foci of said mirror and cap being substantially coincident, an ultra-short wave radiator positioned substantially coincident with said focal points, the focal length of said tubular mirror being substantially smaller than, and the focal length of said cap member being at least equal to, one-fourth the wave length emitted by said radiator, and said cap member consisting of the metallized wall of an electric discharge device containing said radiator.

3. An arrangement for communicating with ultra-short waves comprising a reflector composed of a tubular mirror having a focal point and a cap member of different curvature than said mirror forming the apex of said reflector and also having a focal point, the foci of said mirror and cap being substantially coincident, an ultra-short wave radiator positioned substantially coincident with said focal points, the focal length of said tubular mirror being substantially smaller than one-fourth the wave length emitted by said radiator, and the focal length of said cap member being equal to an odd multiple of one-fourth the wave length emitted by said radiator, said radiator consisting of an electric dipole, and said cap member comprising the metallized wall of an evacuated electric discharge device.

4. An arrangement for communicating with ultra-short waves comprising a reflector composed of a tubular mirror having a focal point and a cap member of different curvature than said mirror forming the apex of said reflector and also having a focal point, the foci of said mirror and cap being substantially coincident, an ultra-short wave radiator positioned substantially coincident with said focal points, the focal length of said tubular mirror being substantially smaller than, and the focal length of said cap member being at least equal to, one-fourth the wave length emitted by said radiator, and said mirror and cap member being separated to form a short circuit condenser therebetween.

KARL KOHL.